Patented July 3, 1951 — 2,559,194

UNITED STATES PATENT OFFICE 2,559,194

TEA SIRUP AND PROCESS FOR MAKING SAME

Marion Lindsey, Corpus Christi, Tex.

No Drawing. Application January 12, 1949,
Serial No. 70,587

9 Claims. (Cl. 99—77)

This invention relates to improved tea syrup concentrates and processes for making same.

The object of this invention is to provide tea syrup concentrates which may be diluted to form hot or cold tea beverages of superior quality and flavor.

Other objects are to provide tea syrup concentrates which may be stored indefinitely without deterioration in flavor or quality; which remain clear and free from any cloudiness at reduced or other temperatures; which do not precipitate their sugar content and which are characterized by reduced susceptibility to mold and other detrimental organisms.

Other objects and advantages will become obvious from the following detailed description.

Tea syrup concentrates, in general, comprise strong tea extracts highly sweetened with sucrose sugar. Hitherto, these concentrates have suffered from various disadvantages. Many concentrates become cloudy, particularly at the reduced temperatures of refrigeration. Because of the high susceptibility of the concentrates to deteriorative organisms, such as mold, they must be maintained under refrigeration. The muddiness which develops under these conditions is obviously undesirable to the consumer. Tea concentrates which are not subject to the development of such undesirable turbidity are generally too sweet for most consumers and frequently precipitate a portion of the dissolved sugar during storage. The sweetened extracts are also highly susceptible to mold and other undesirable organisms so that even under refrigeration, they cannot be stored for extended periods of time after opening of the sealed containers. Another objection to many concentrates hitherto produced is their poor flavor, particularly an accentuated bitter tang which is distasteful to the average person.

I have discovered that I can overcome these disadvantages by substituting glucose for a portion of the sucrose hitherto employed as the sweetening agent and by carefully regulating the total quantity of the combined sugars for a given quantity of brew. I have also discovered that I can eliminate the undesirable bitterness by the addition of a small amount of sodium benzoate.

In preparing the tea syrup of my invention, I preferably employ a good grade of tea, as for example, an orange pekoe blend in which the long leafed or better grade variety is preponderant. My process is not confined to any particular grade or variety of tea, but obviously, superior grades will result in extracts of better flavor. The leaves are covered with water which has been brought just to the boiling point and maintained in contact for about twenty minutes. Preferably, the tea leaves are kept slowly agitated during the extraction period and the water is kept sufficiently hot to prevent the turbidity which develops when the extract cools to lukewarm. Ordinary tap water may be employed, but I prefer to use distilled water since chlorinated or treated tap water tends to impair the tea flavor. It is also preferable not to boil the water prior to use for any length of time, since boiled water imparts a flat taste. If desired, the extraction may be made in a container having a bottom provided with perforations through which the tea extract may descend into a large container in which subsequent admixture with the necessary ingredients may be accomplished.

The quantity of water employed will, of course, vary according to the desired strength of the brew. I obtain excellent results with respect to flavor, strength and economically complete utilization of the flavoring principles in the tea leaves when I use somewhat less than one gallon of water per pound of tea. A certain quantity of water is absorbed and retained by the tea leaves. This averages about three pints per pound of tea.

After separation of the tea extract from the tea leaves, the glucose and sucrose sugars are added. Preferably, the brew is kept hot during the addition and solution of the sugars. The sugars may be obtained from any desired source. For example, the sucrose may be in the form of either cane or beet sugar and the glucose in the form of corn sugar, or the like. I have found that the combined, total quantity of sugars added should not be less than about 8.3 pounds, and no more than about 10.7 pounds per gallon of aqueous tea extract. If smaller amounts are used, the tea will become turbid at reduced temperatures. If larger quantities are used, separation of the sugars will occur during storage, particularly at refrigeration temperatures. Best results are obtained within a range of about 8.3 to 9.3 pounds per gallon, with respect to flavor, keeping qualities and sweetness.

The glucose which replaces a portion of the sucrose, gives excellent body to the tea concentrate and reduces the sweetness. Tea syrups sweetened with sucrose alone in equivalent requisite amounts, namely, about 8.3 to 9.3 pounds per gallon of tea extract, are generally too sweet for average taste, unless excessively diluted to the point where the tea flavor is lost or badly impaired. The glucose also greatly reduces the susceptibility of the syrup to undesirable organisms, such as sugar molds. Whereas, a tea syrup containing only sucrose in equivalent quantities will develop mold very quickly after the sealed airtight container is opened, if kept at ordinary temperatures, the syrup containing glucose will keep for a week or more. Even under refrigeration, the sucrose syrups will mold within a relatively short time, whereas, the syrup containing glucose will keep for many weeks at the usual refrigeration temperatures after opening of the sealed container. The tea concentrates of my invention retain their superior flavor and clear amber color indefinitely and they develop no trace of cloudiness at reduced or other temperatures either during storage in sealed containers prior to use, or subsequently, even though a long interval of time may elapse between opening of the container for initial use and complete utilization of the contents.

For best results, the ratio of glucose to sucrose should be within the range of about 3 parts glucose to 5 parts of sucrose through about 5 parts of glucose to 3 parts sucrose. Equal quantities of the two sugars give a tea syrup of medium sweetness which is palatable to most tastes. By varying the ratio of the sugars, less sweet or sweeter syrups will be obtained, as desired. However, syrups prepared with the highest proportion of sucrose within the aforementioned range, will not be too sweet for the average taste. Larger proportions of sucrose than those within the preferred range may be employed, but will tend to make the syrup sweeter than may be desirable and to increase susceptibility to mold. Larger proportions of glucose may also be used, but result in brews of somewhat poorer flavor.

A disadvantageous characteristic of tea syrups which may be an important reason for their not coming into more popular favor, is their bitter tang to which many people object. I have found that I can eliminate this bitterness by adding to the syrup a very minor quantity of sodium benzoate, preferably in an amount about one tenth percent by weight of the syrup. The tea treated in this manner has a pleasing, mild, mellow flavor. The sodium benzoate, in addition, contributes its known preservative properties to the tea syrup.

*Example*

Eight (8) gallons and one (1) pint of distilled water which had been heated just to the boiling point were poured over nine (9) pounds of an orange pekoe blend tea. The leaves were kept slowly agitated in the water and the water kept hot. After twenty minutes the concentrated tea extract was separated from the leaves. The total quantity of resulting extract was five gallons and one quart, since some of the water was retained by the leaves. While the extract was still hot, 24½ pounds of corn sugar and 24½ pounds of cane sugar were added and dissolved. 1.4 ounces of sodium benzoate was then added. The resulting tea syrup concentrate was characterized by a clear, amber color, full bodied, mellow flavor and excellent keeping qualities. Two years after bottling in sealed containers, tea concentrates prepared in the afore-described manner showed no deterioration in clarity, color or flavor.

To obtain a less sweet syrup, the total amount of sugars added may be reduced to 43¾ pounds and the ratio of corn sugar increased with respect to the cane sugar, the maximum preferably being five parts of corn sugar to three parts of cane sugar.

For actual use the tea syrup may be diluted as desired to suit the individual taste. In general, one tablespoonful of syrup is sufficient for a cup of hot tea, and two tablespoonfuls for a tall glass of iced tea. The tea syrup is very suitable for use both in the home and in public eating places, such as restaurants, snack bars, and the like, since it may be accurately dispensed to suit individual tastes, eliminates waste and is uniformly superior in flavor.

Although this invention has been described with reference to illustrative embodiments thereof, it will be apparent to those skilled in the art that the principles of this invention may be embodied in other forms but within the scope of the appended claims.

Having thus described my invention, I claim:

1. A tea syrup comprising, concentrated aqueous tea extract in admixture with glucose and sucrose sugars, said sugars being present in total amount from about 8.3 to about 10.7 pounds per gallon of said extract, and the ratio of said glucose to said sucrose being within a range of about 3 parts glucose to 5 parts sucrose through about 5 parts glucose to 3 parts sucrose.

2. A tea syrup comprising, concentrated aqueous tea extract in admixture with glucose and sucrose sugars, said sugars being present in total amount from about 8.3 to about 9.3 pounds per gallon of said extract, and the ratio of said glucose to said sucrose being within a range of about 3 parts glucose to 5 parts sucrose through about 5 parts glucose to 3 parts sucrose.

3. A tea syrup comprising, concentrated aqueous tea extract in admixture with glucose and sucrose sugars, said sugars being present in total amount from about 8.3 to about 10.7 pounds per gallon of said extract, and the ratio of said glucose to said sucrose being within a range of about 3 parts glucose to 5 parts sucrose through about 5 parts glucose to 3 parts sucrose, and sodium benzoate in an amount comprising about one tenth percent by weight of the combined weight of said aqueous tea extract and said sugars, said sodium benzoate serving to enhance the mellow flavor of said tea syrup.

4. A tea syrup comprising, concentrated aqueous tea extract in admixture with glucose and sucrose sugars, said sugars being present in total amount from about 8.3 to about 9.3 pounds per gallon of said extract, and the ratio of said glucose to said sucrose being within a range of about 3 parts glucose to 5 parts sucrose through about 5 parts glucose to 3 parts sucrose, and sodium benzoate in an amount comprising about one tenth percent by weight of the combined weight of said aqueous tea extract and said sugars, said sodium benzoate serving to enhance the mellow flavor of said tea syrup.

5. A tea syrup comprising, concentrated aqueous tea extract in admixture with corn sugar and cane sugar, said sugars being present in total amount from about 8.3 to about 9.3 pounds per gallon of said extract, and the ratio of said corn sugar to said cane sugar being within a range of about 3 parts corn sugar to 5 parts cane sugar through about 5 parts corn sugar to 3 parts cane sugar.

6. A method for making a tea syrup comprising, preparing a concentrated aqueous tea extract by treating tea leaves with hot water, and dissolving in said extract sugars comprising glucose and sucrose, said sugars being added in total amount from about 8.3 to about 10.7 pounds per gallon of said extract, and the ratio of said glucose to said sucrose being within a range of about 3 parts glucose to 5 parts sucrose through about 5 parts glucose to 3 parts sucrose.

7. A method for making a tea syrup comprising, preparing a concentrated aqueous tea extract by treating tea leaves with hot water, and dissolving in said extract sugars comprising glucose and sucrose, said sugars being added in total amount from about 8.3 to about 9.3 pounds per gallon of said extract, and the ratio of said glucose to said sucrose being within a range of about 3 parts glucose to 5 parts sucrose through about 5 parts glucose to 3 parts sucrose.

8. A method for making a tea syrup comprising, preparing a concentrated aqueous tea extract by treating tea leaves with hot water, and dissolving in said extract sugars comprising glucose and sucrose, said sugars being added in total amount from about 8.3 to about 9.3 pounds per gallon of said extract, and the ratio of said glucose to said sucrose being within a range of about 3 parts glucose to 5 parts sucrose through about 5 parts glucose to 3 parts sucrose, and sodium benzoate in an amount comprising about one tenth percent by weight of the combined weight of said aqueous tea extract and said sugars, said sodium benzoate serving to enhance the mellow flavor of said tea syrup.

9. A method for making a tea syrup comprising, treating tea leaves in sufficient quantity to produce a concentrated tea extract with distilled water heated just to its boiling point, separating the resulting concentrated tea extract and dissolving in said extract, while said extract is still at an elevated temperature, sugars comprising glucose and sucrose, said sugars being added in total amount from about 8.3 to about 9.3 pounds per gallon of said extract, and the ratio of said glucose to said sucrose being within a range of about 3 parts glucose to 5 parts sucrose through about 5 parts glucose to 3 parts sucrose, and sodium benzoate in an amount comprising about one tenth percent by weight of the combined weight of said aqueous tea extract and said sugars, said sodium benzoate serving to enhance the mellow flavor of said tea syrup.

MARION LINDSEY.

REFERENCES CITED

The following references are of record in the file of this patent:

UNITED STATES PATENTS

| Number | Name | Date |
|---|---|---|
| 1,520,122 | Gephart et al. | Dec. 23, 1924 |
| 1,525,272 | Darrah | Feb. 3, 1925 |
| 1,596,986 | Merrell | Aug. 24, 1926 |